United States Patent [19]
Bailey et al.

[11] 3,751,080
[45] Aug. 7, 1973

[54] CONNECTING ROD MANUFACTURING

[75] Inventors: John M. Bailey, Dunlap; Donald G. Zook, Metamora, both of Ill.

[73] Assignee: Caterpillar Tractor Co., Peoria, Ill.

[22] Filed: Jan. 15, 1971

[21] Appl. No.: 106,804

[52] U.S. Cl. ............................ 287/52.03, 74/579 E
[51] Int. Cl. ............................................. B60b 27/06
[58] Field of Search ...................... 74/579 R, 579 E; 287/52.03; 308/74

[56] References Cited
UNITED STATES PATENTS

| 2,553,935 | 5/1951 | Parks et al. | 74/579 E UX |
| 2,371,399 | 3/1945 | Mantle | 287/52.03 UX |
| 3,285,098 | 11/1966 | Beveridge | 74/579 |
| 3,411,378 | 11/1968 | Borgeaud | 74/579 |

*Primary Examiner*—Andrew V. Kundrat
*Attorney*—Fryer, Tjensvold, Feix, Phillips & Lempio

[57] ABSTRACT

High quality connecting rods and similar machine components comprised of an assembly of two clamped together parts are manufactured from tough heat treated high carbon steel, or the like, according to a manufacturing method of reduced cost. Essentially all machining of the component is conducted on an integral piece prior to its being divided into the two separate parts by fracturing along a frangible zone effected by electron beam bombardment. The resulting irregular mating surfaces of the respective parts have substantial resistance to relative sliding upon clamping of the parts together.

3 Claims, 6 Drawing Figures

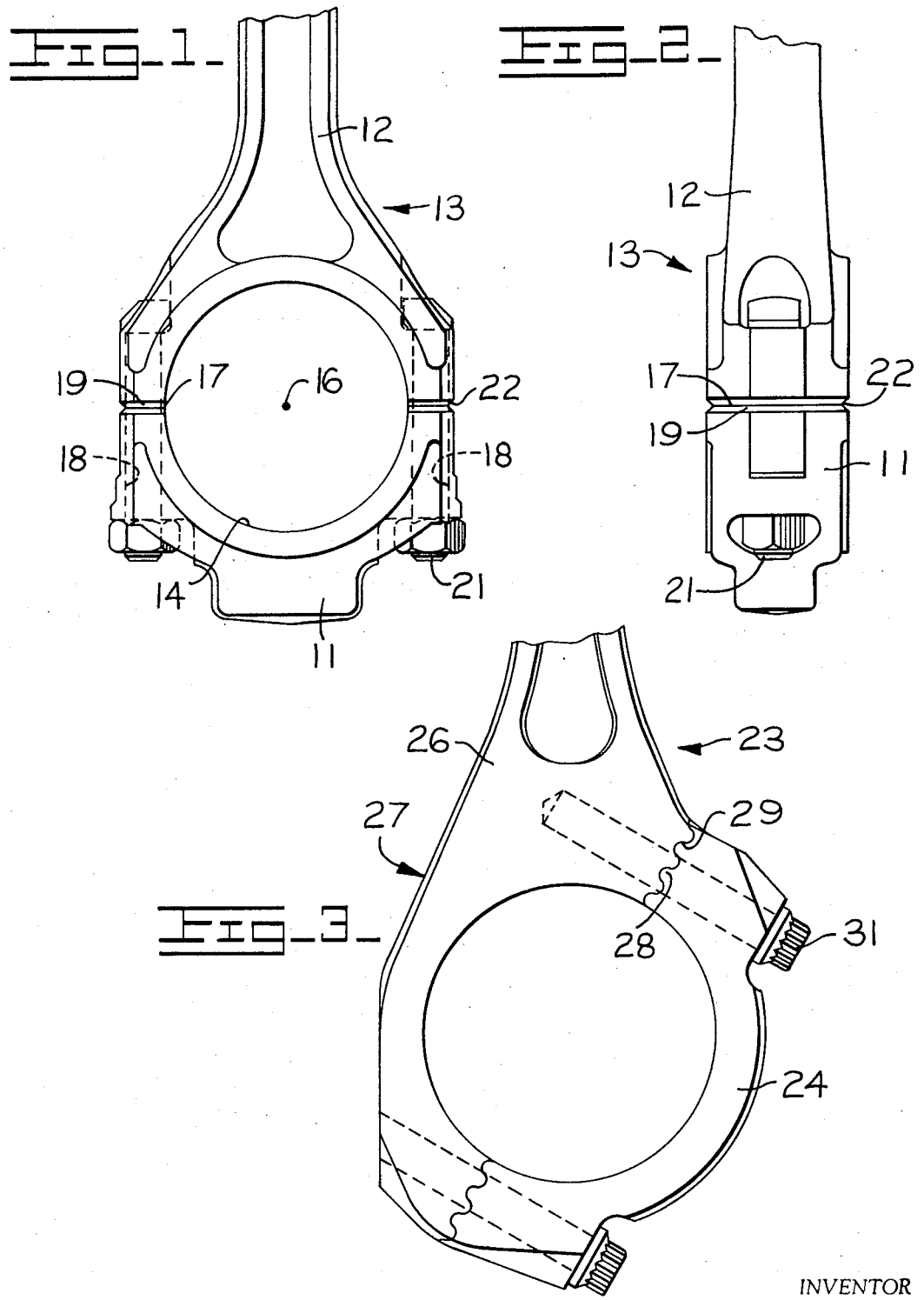

PATENTED AUG 7 1973 3,751,080

INVENTORS
JOHN M. BAILEY
DONALD G. ZOOK
BY
Fryer, Tjensvold, Feix, Phillips & Lempio
ATTORNEYS

CONNECTING ROD MANUFACTURING

BACKGROUND OF THE INVENTION

Many machine components, such as connecting rods, track links, journal boxes, etc., require two parts clamped together by fasteners, or the like, to form a unitary part which accepts bearing shells, shafts, pins or the like. In the case of connecting rods the bore must be accurately machined and its center line generally lies on or near a plane through the joint of the two adjacent parts comprising the assembled component.

Manufacture of such components usually involves casting or forging the parts separately, rough machining the separate parts, machining the joining faces to mate, drilling holes to accept fasteners for securing the parts together, bolting the mating parts together, and perhaps machining the bore defined by the assembled parts accurately for fitting of a bearing or shaft. Alternatively, the parts are cast or forged, as an integral piece, holes are drilled to accept fasteners for securing the parts together, the piece is saw cut to obtain two parts, the half bores are rough machined, the joining faces are machined, the parts are bolted together, and the bore is machined to obtain a finished diameter.

All of the steps of either manufacturing method require accurate, and thus expensive machining operations. Hence, elimination of any of the steps results in generally less costly, more easily made part.

With a view to eliminating some of the steps and reducing the manufacturing cost, various machine components, such as connecting rods for inexpensive engines, generlly of cast iron or nonferrous materials, have been made by casting or forging the component to size, machining all bores and surfaces, and then breaking the component across the center line of the bore. The parts are bolted together to provide an assembled component having a perfectly formed bore. This method eliminates several machining operations including machining of the mating surfaces and clamping of the parts together prior to finish machining of the bore. In addition, the many small imperfections or irregularities in the mating surfaces created by the crack serve to lock the parts together and prevent sliding.

Unfortunately, high quality connecting rods and the like, such as are utilized in diesel engines and high output gasoline engines for example, are made of a relatively high carbon steel heat treated to provide a toughness and hardness unsuitable for breaking without excessive distortion of the component. Therefore, the latter cost reduction method which has been successfully employed in the manufacture of various two part components from relatively brittle materials, such as cast iron, has not been applicable to tough materials, such as high quality steel.

SUMMARY OF THE INVENTION

The general object of the present invention is to provide a cost reduction method of manufacturing various multiple part machine components, such as connecting rods and track links, from high quality steel or similar tough, hard material in a manner similar to that employed with relatively brittle material conducive to breaking of a finish machined integral piece to form the finished separate parts of the component.

In the accomplishment of the foregoing, and other objects and advantages, the method of the present invention generally includes forming the parts of a multiple part component as an integral piece from high carbon steel and rough machining the piece to approximately final dimensions, electron beam bombarding the piece along a preselected path to heat the steel in a narrow band and form a brittle frangible zone upon quenching, finish machining the piece to final dimensions, and fracturing the piece through the frangible zone.

The parts of the component thus formed have irregular complementary mating surfaces which upon fastening the parts together provide a joint having substantial resistance to relative sliding between the parts of the assembled component.

BRIEF DESCRIPTION OF THE DRAWING

FIG. 1 is a front elevational view of a connecting rod depicting manufacture in accordance with the present invention.

FIG. 2 is a side elevational view of the connecting rod.

FIG. 3 is a front elevational view of a modified form of connecting rod depicting a modification in the manufacturing method.

DETAILED DESCRIPTION OF THE INVENTION

Figure 4:
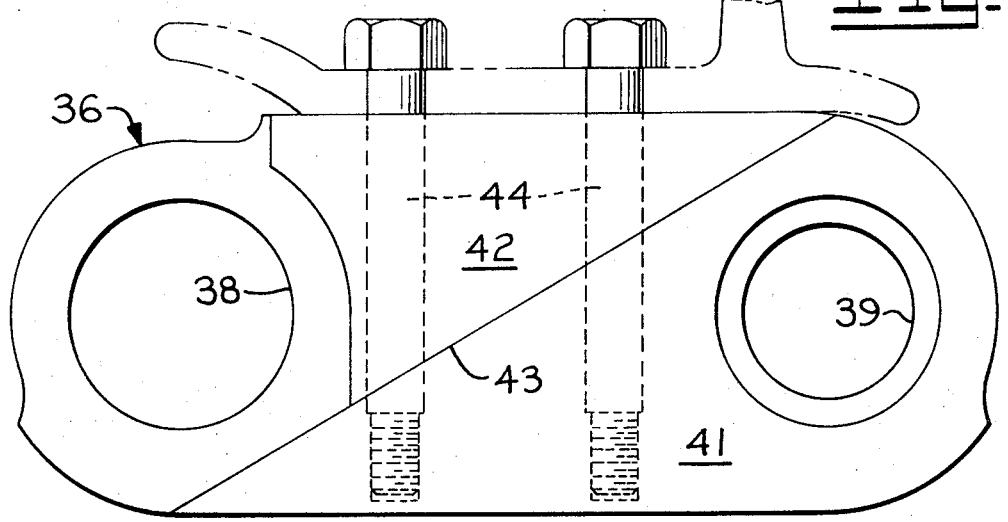
FIG. 4 is a side elevational view of a master track link manufactured in accordance with the present invention.

In accordance with the present invention a connecting rod is manufactured from tough, hard, high quality metal, such as high carbon steel, with a reduced cost of manufacturing. Although the invention is specifically described with respect to the manufacture of connecting rods, it will be apparent from the ensuing description that the invention is equally applicable to the manufacture at reduced cost approximately similar multiple part component assemblies having an accurately machined bore.

Considering now the invention in detail with respect to the manufacture of a connecting rod, the connecting rod is forged or otherwise formed from high carbon steel, or similar tough metal to provide a cap 11 and rod 12 as an integral piece 13. A bore 14 is provided during the forming of the piece with its center line 16 lying apporximately on a desired parting plane 17 between the cap 11 and rod 12.

The piece is then rough machined to approximately the final dimensions of the component. In addition, bolt holes 18 are drilled through the piece on opposite sides of the bore 14 in right angular relation to the parting plane 17.

In accordance with the particularly salient aspects of the invention, the piece 13 is bombarded with a beam of high energy electrons along a path exteriorly intersected by the parting plane 17. The metal in a very narrow band is locally heated by the electron beam above the austenitic temperature of the metal and is quenched by the surrounding cold metal to produce a narrow frangible zone 19 of very hard brittle steel in the parting plane 17. In some instances, it may be desirable to employ a liquid or vapor quench to enhance the quenching by the surrounding cold metal.

It should be noted that the width of the frangible zone 19 is a function of the depth of penetration of the impinging electron beam. Consequently, an even narrower brittle zone may be produced, if desired, by simultaneously directing two electron beams upon the piece from the opposite sides thereof. In any event, the properties of the metal outside of the narrow frangible zone 19 of the piece are unaffected by the electron beam bombardment.

In the accomplishment of the electron beam bombardment step of the manufacturing method, the large or bore end of the rod piece 13 is preferably placed on a locating fixture in an electron beam welder apparatus of conventional design, clamped by sealed members, and the small surrounding space almost instantly evacuated. The high energy electron beam is then passed across the bore end of the piece along the desired path to effect the frangible zone 19. The bombarded piece is then removed from the electron beam apparatus. It has been found that the electron bombardment operation costs less than ten cents.

With the piece 13 thus provided with the frangible zone 19, the piece is finish machined to final dimensions, including finish machining of the bore 14. This also serves to clear up any blemishes which may have been produced by electron beam bombardment.

Finally, the piece 13 is fractured, as by impact, through the frangible zone 19 to provide the finished cap and rod parts 11 and 12 of the connecting rod assembly. The complementary irregularities in the mating surfaces produced by the fracture provide a joint having substantial resistance to relative sliding between the parts upon clamped assembly thereof by means of fasteners 21 extending through the bolt holes 18. Such a slide resistant joint minimizes fretting and ultimate failure of the assembled connecting rod.

Although the frangible zone 19 is sufficiently brittle to facilitate a suitable fracture upon impact of one of the parts 11 or 12 relative to the other, in some instances it may be desirable to form a stress concentrating notch 22 circumscribing the zone. Such a notch insures fracture in the frangible zone when separating the parts.

Referring now to FIG. 3, a modification of the connecting rod manufacture of the invention is depicted as applied to an angle aplit connecting rod assembly 23. Here again the cap and rod parts 24 and 26 of the assembly are integrally provided as a forged, or otherwise suitably formed single piece 27 which is rough machined to approximately final dimensions.

However, a brittle frangible zone 28 is produced by electron beam bombardment in the manner previously described to generally lie in a separation plane which is at an acute angle to the longitudinal center line of the rod part 26, rather than at right angles as in the embodiment of FIGS. 1 and 2.

Of more importance, the electron beam is directed along an undulated path in its bombardment of the piece 27 to effect the frangible zone 28. Thus, upon fracture of piece through the undulated frangible zone 28 subsequent to finish machining of the piece, the resulting finished cap and rod 24 and 26 have mating wavy surfaces 29.

Upon clamped assembly of the parts by means of fasteners 31, the wavy mating surfaces further increase the resistance to relative sliding therebetween. It will be appreciated than an undulated frangible zone may likewise be applied to the embodiment of FIGS. 1 and 2 if desired.

In addition the present invention is also suitable for manufacturing other types of components such as, for instance, a master track link used to retain the track on a crawler vehicle, or the like. One such master link made in accordance with the invention is shown in FIG. 4.

Referring to FIG. 4, such a master link 36 comprises an elongated forging having a first bore 38 at one end thereof and a second bore 39 at the other end thereof. Bores 38 and 39 are positioned so as to accept track pins (not shown) therethrough which track pins hold the opposite ends of a track (not shown) in circling relationship around the sprocket wheels and idlers of a tracked vehicle.

The link 36 is split into two parts 41 and 42 along the plane 43 which runs diagonally from below bore 38 to above bore 39. The parts 41 and 42 are clamped together by means of fasteners, e.g., bolts 44 which pass through one part 42 and thread into the other part 41.

It will be apparent that the master link 36 may be split into two separate parts 41 and 42 by simply removing fasteners 44 or clamped into a single unitary part or link 36 by threading fasteners 44 back into the clamping positions.

Figure 6:
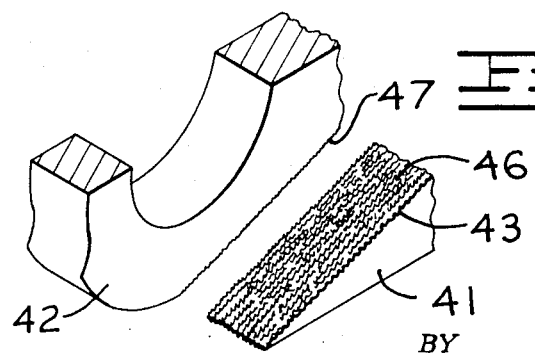
FIG. 6 is an enlarged view of a portion of a fracture plane in accordance with the present invention.

FIG. 6 shows a portion of the fracture plane 43 in a greatly enlarged and exaggerated illustration. However, it can be seen that the mating surface 46 of plane 43 comprises a great number of microscopic ridges, teeth and serrations which mate with similar irregularities on the facing upper surface 47 of the plane 43. Such irregularities hold both parts of the link 36 in exact alignment under all conditions.

The link 36 is manufactured in exactly the same manner as previously described with regard to connecting rod 13 to provide the two parts 41 and 42 and their mating fracture plane 43.

Figure 5:
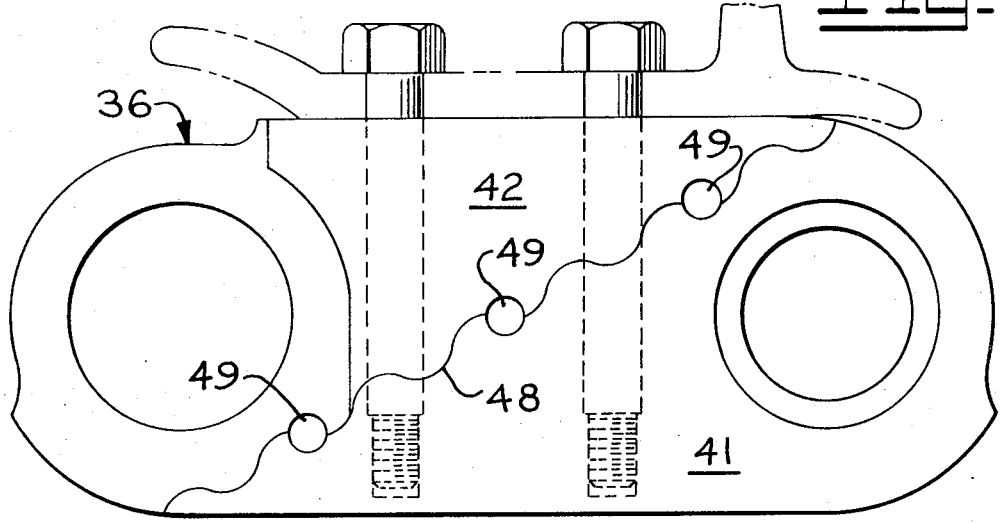
FIG. 5 is a side elevational view of a variation of a master track link.

In another variation as shown in FIG. 5, the master link 36 may be provided with a wavy mating plane 48 of the same configuration as that provided in connecting rod 23 illustrated in FIG. 3. In such instance, the link 36 may be provided with a number of small bores 49 along the length of fracture plane 48 for the purpose of ensuring the correct fracture of plane 48 when the electron beam treated link is separated by the application of pressure thereto.

it will be obvious from the specific descriptions above, that the technique of the present invention is also suitable for components that are to be fractured into three or even more parts. Thus by selecting the positions at which the component is bombarded with the electron beam, any desired configuration and number of fractured parts may be obtained.

Although the invention has been hereinbefore described and illustrated in the accompanying drawing with particular reference to several preferred embodiments, same are not intended to be in any way limiting upon the invention, reference being made to the appended claims for a precise delineation of the true spirit and scope of the invention.

What is claimed is:

1. A machine component comprising an assembly of at least two parts of high quality metal with each part having a parting line extending across the same, said parting line extending into each of the parts a predetermined depth equal to the depth of penetration of an impinging high energy electron beam and extending around the periphery of each of said parts and having an overall continuously smooth regularly undulating configuration, a stress concentrating notch having an apex contiguous with said parting lines when said parts are brought together and radiating above and below said line to facilitate and insure the fracturing along said line, holes disposed through said parting line, and fasteners disposed therein for securing said parts together.

2. The machine component of claim 1 wherein said component is a connecting rod.

3. The machine component of claim 1 wherein said component is a track link.

* * * * *